US006973465B2

(12) United States Patent
Kuzmin

(10) Patent No.: US 6,973,465 B2
(45) Date of Patent: Dec. 6, 2005

(54) MECHANISM FOR MIGRATING A FILE SEQUENCE WITH VERSIONING INFORMATION FROM ONE WORKSPACE TO ANOTHER

(75) Inventor: Aleksandr M. Kuzmin, Santa Clara, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 448 days.

(21) Appl. No.: 10/133,011

(22) Filed: Apr. 26, 2002

(65) Prior Publication Data

US 2003/0204531 A1    Oct. 30, 2003

(51) Int. Cl.[7] .............................................. G06F 12/00
(52) U.S. Cl. ......................................... 707/203; 707/10
(58) Field of Search ............................. 707/203, 204, 707/205, 10

(56) References Cited

U.S. PATENT DOCUMENTS

| 5,634,052 | A | * | 5/1997 | Morris ........................... 707/1 |
| 5,806,078 | A | * | 9/1998 | Hug et al. .................... 715/511 |
| 6,233,589 | B1 | * | 5/2001 | Balcha et al. ................ 707/203 |
| 6,374,250 | B2 | * | 4/2002 | Ajtai et al. .................. 707/101 |
| 6,389,592 | B1 | * | 5/2002 | Ayres et al. ................. 717/172 |
| 6,401,239 | B1 | * | 6/2002 | Miron .......................... 707/203 |
| 2002/0169740 | A1 | * | 11/2002 | Korn | |

* cited by examiner

Primary Examiner—Luke S Wassum
Assistant Examiner—Susan F. Rayyan
(74) Attorney, Agent, or Firm—Hickman Palermo Truong & Becker, LLP; Christopher J. Brokaw

(57) ABSTRACT

A mechanism is disclosed for migrating a file sequence from a first workspace managed by a first workspace management system into a second workspace managed by a second workspace management system. To carry out the file sequence migration, the mechanism does not implement a format conversion process. Instead, the mechanism invokes and exploits the functionality provided by the workspace management systems. By avoiding the format conversion process, the mechanism is able to carry out the migration process much more easily and cost effectively.

22 Claims, 4 Drawing Sheets

MECHANISM FOR MIGRATING A FILE SEQUENCE WITH VERSIONING INFORMATION FROM ONE WORKSPACE TO ANOTHER

FIELD OF THE INVENTION

This invention relates generally to computer systems, and more particularly to a mechanism for migrating a file sequence from one workspace to another.

BACKGROUND

In developing software, it is important to track the changes made to source code files. If this is not done, it will be very difficult, if not impossible, to determine at a later time what was changed from one version of the source code to another. To track changes made to source code files, many companies use a versioning control system. With a versioning control system, whenever a file is changed or updated, the change is noted in a version history for the file. This history tracks all of the changes made to the file; thus, at any time, given the version history, it is possible to ascertain what changes were made between any versions of the file. Currently, a number of different versioning control systems are known and commercially available.

At some point, after a set of files have been entered into and managed by a versioning control system, it may be necessary to migrate those files from one versioning control system to another. This may be necessary, for example, if a company is moving from one platform (e.g. Windows) to another (e.g. UNIX), or if the company is changing from an old versioning control system to a new and better one. Whatever the reason, a smooth transition from one system to the other needs to be made such that all files and version histories are maintained, and the transition is transparent to the end users (e.g. the source code developers). This can be a very difficult, costly, and time-consuming task.

To elaborate, versioning control systems usually store version history information in proprietary formats. What this means is that one versioning control system will not be able to comprehend or interpret the version history information from another versioning control system. As a result, it is not possible to simply copy the version history information from one system to another. Instead, to migrate version history information, some sort of conversion or transformation process is typically implemented. This process converts the format of the version history information from the format used by the old versioning control system to the format used by the new versioning control system. Developing an automated system that carries out this conversion process can be quite costly, especially in terms of manhours, because it requires the developer of the system to learn the formats of both versioning control systems, and to develop techniques for converting from one format to the other. In many situations, this cost can be prohibitive.

The format conversion technique discussed above assumes that the formats used by the different versioning control systems can be ascertained. In some cases, the formats used by one or both of the versioning control systems may be kept proprietary by the makers of the systems. In such cases, it is not even possible to use the conversion technique noted above.

As this discussion illustrates, migrating files from one versioning control system to another is currently a high cost proposition fraught with potential difficulties. To avoid these drawbacks, an improved migration mechanism is needed.

SUMMARY

In accordance with one embodiment of the present invention, there is provided an improved mechanism for migrating a file sequence (which may comprise a version history) from a first workspace managed by a first workspace management system (which may be a versioning control system) to a second workspace managed by a second workspace management system. In one embodiment, the migration is achieved by taking advantage of the functionality provided by the workspace management systems rather than by a format conversion process. According to one embodiment, a control mechanism is used to coordinate the migration process.

Initially, the control mechanism obtains from the first workspace management system (WMS) a list of the file sequences in the first workspace. Thereafter, the control mechanism migrates each file sequence one at a time from the first workspace to the second workspace. To migrate a file sequence, the control mechanism obtains from the first WMS a base file for the file sequence. This base file basically represents the first version of the file. After the control mechanism obtains the base file, it causes the second WMS to create a new file sequence in the second workspace, and to create a new base file in the new file sequence. The new base file is created based upon the existing base file in the first workspace. In this manner, the base file is migrated from the first workspace to the second workspace.

Thereafter, the control mechanism obtains from the first WMS a first revised version of the existing base file. This first revised version of the existing base file is derived by the first WMS by applying a first delta to the existing base file. As used herein, a delta refers to a data structure that comprises one or more changes to be applied. Basically, the first delta specifies the changes that need to be made to the existing base file to derive a first revised version of the existing base file. The first delta is stored in the first workspace in a first format understood by the first WMS. Since it is the first WMS that is applying the first delta to derive the first revised version of the existing base file, the control mechanism does not need to understand or know anything about the format of the first delta.

After obtaining the first revised version of the existing base file, the control mechanism causes the second WMS to create a new first delta in the new file sequence in the second workspace. In one embodiment, the control mechanism causes the second WMS to create the new first delta by invoking a delta create functionality of the second WMS. The delta create functionality compares the first revised version of the existing base file with the new base file in the new file sequence, and determines what change or changes need to be made to the new base file to transform the new base file into the first revised version of the existing base file. The changes that need to be made are stored in the new first delta. Note that this new first delta in the second workspace is a counterpart of the first delta in the first workspace. Because the new first delta is created by the second WMS, it is in a format that the second WMS understands. In this manner, the control mechanism effectively migrates the first delta from the first workspace to the second workspace without having to perform any format conversion.

The control mechanism continues to obtain revised versions of the existing base file from the first WMS, and continues to cause the second WMS to create new deltas in the new file sequence in the second workspace in the manner discussed above until all of the deltas in the file sequence in the first workspace have a corresponding new delta in the new file sequence in the second workspace. Once that is done, the file sequence is effectively migrated to the second workspace.

In addition to migrating the base file and the deltas, the control mechanism may also migrate some additional information (such as system information) from the first workspace to the second workspace. The control mechanism may also perform additional operations (e.g. macro transformations) on the migrated file sequence. These and other operations may be carried out within the scope of the present invention.

DETAILED DESCRIPTION OF EMBODIMENT(S)

Background Information

Figure 1:
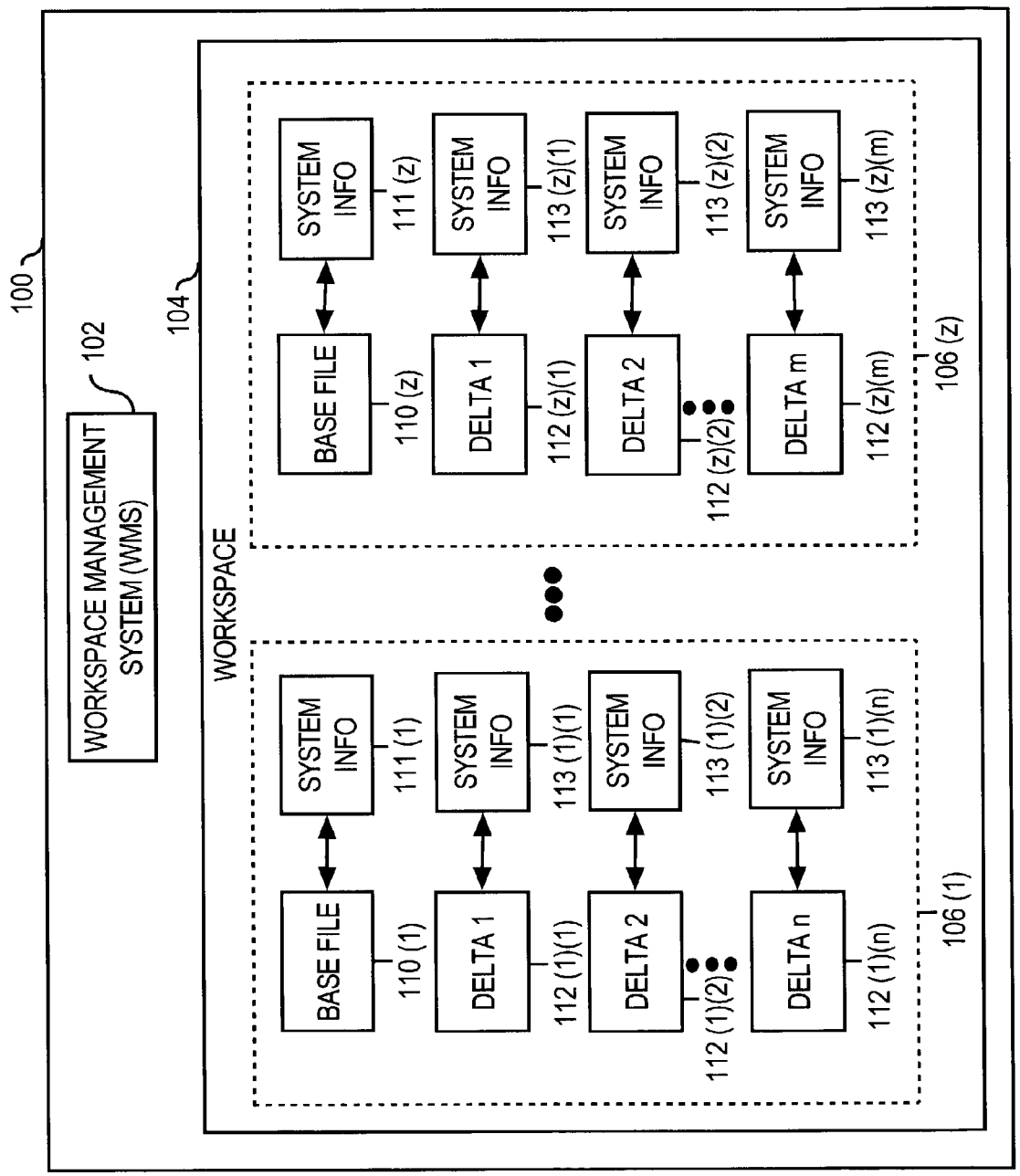
FIG. 1 is a block diagram of a computer system in which a typical workspace management system and a workspace are implemented.

Before describing the invention in detail, a short discussion of certain aspects of the prior art will first be provided in order to facilitate a complete understanding of the invention. With reference to FIG. 1, there is shown a block diagram of a computer system 100 in which a typical workspace management system (WMS) 102 and a workspace 104 are implemented. As shown in FIG. 1, the workspace 104 stores the one or more file sequences 106 that are managed by the WMS 102. For purposes of this discussion, a file sequence 106 may be thought of as a complete history of a file (as used herein, the term "file" refers generally to any data structure that can be stored and updated, such as a set of source code).

As shown, each file sequence 106 comprises a base file 110 and zero or more deltas 112. The base file 110 represents the initial version of a file, and the deltas 112 represent the subsequent changes to the file. To conserve storage, each delta 112 is not a full revised version of the file. Instead, a delta 112 comprises just the changes that have been made to the file since the last delta 112. Thus, given just a delta 112, it is not possible to generate a full revised version of the file. Rather, the delta 112 (and possibly some other deltas 112) needs to be applied to the base file 110 to derive a full revised version of the file.

For example, for file sequence 106(1), to derive a first full revised version of the file, the WMS 102 applies the first delta 112(1)(1) to the base file 110(1). This operation generates a full view of the file after the changes in the first delta 112(1)(1) have been made. To generate a full view of the file after the changes in the second delta 112(1)(2) have been made, the WMS 102 applies both the first delta 112(1)(1) and the second delta 112(1)(2), in sequential order, to the base file 110(1). To generate a view of the latest revised version of the file, the WMS 102 applies all of the deltas 112(1), one after the other, to the base file 110(1). Thus, as this discussion shows, the deltas 112 build upon one another.

The deltas 112 are created by the WMS 102. Usually, a delta 112 is created at the time that a file is checked in to the workspace 104. To illustrate this, reference will be made to an example. Suppose that file sequence 106(1) currently comprises just the base file 110(1) and the first delta 112(1)(1). Suppose further that a user checks the file associated with file sequence 106(1) out of the workspace 104. Suppose further that the user makes some changes to the file, and then checks the file back into the workspace 104. At the time that the file is checked back in to the workspace 104, the WMS 102 performs a comparison to determine the differences between the file as it currently stands (with the user's changes) and the previous version of the file (in this example, the previous version of the file is derived by applying the first delta 112(1)(1) to the base file 110(1)). If there are any differences (and there are in this example), the WMS 102 will create a new delta 112 in the file sequence 106(1). In the present example, the WMS 102 will create a second delta 112(1)(2) in the file sequence 106(1), and will store within the second delta 112(1)(2) the changes that need to be made to the previous version of the file to transform it into the current version of the file. In this manner, the WMS 102 creates deltas 112 within the file sequences 106. Because it is the WMS 102 that creates the deltas 112, the deltas 112 are in a format that the WMS 102 can comprehend and interpret. Thus, the WMS 102 will be able to apply the deltas 112 to the base file 110 at a later time to derive a full view of the file.

In addition to a base file 110 and one or more deltas 112, the WMS 102 also maintains some system information with each file sequence 106. As shown in FIG. 1, each base file 110 has a set of system information 111 associated therewith, and each delta 112 has a set of system information 113 associated therewith. Unlike the base file 110 and the deltas 112, the system information does not relate to the content of a file. Rather, the system information pertains to information that may be useful from an administrative standpoint. For example, the system information 111 associated with a base file 110 may specify which user created the file, when the file was created, and any comments related to the file. Similarly, the system information 113 associated with a delta 112 may specify which user made the changes embodied in the delta 112, when the changes were made, and any comments related to the changes. With such system information, it is possible, at a later time, to obtain a clear history of progression for a file.

System Overview

Figure 2:
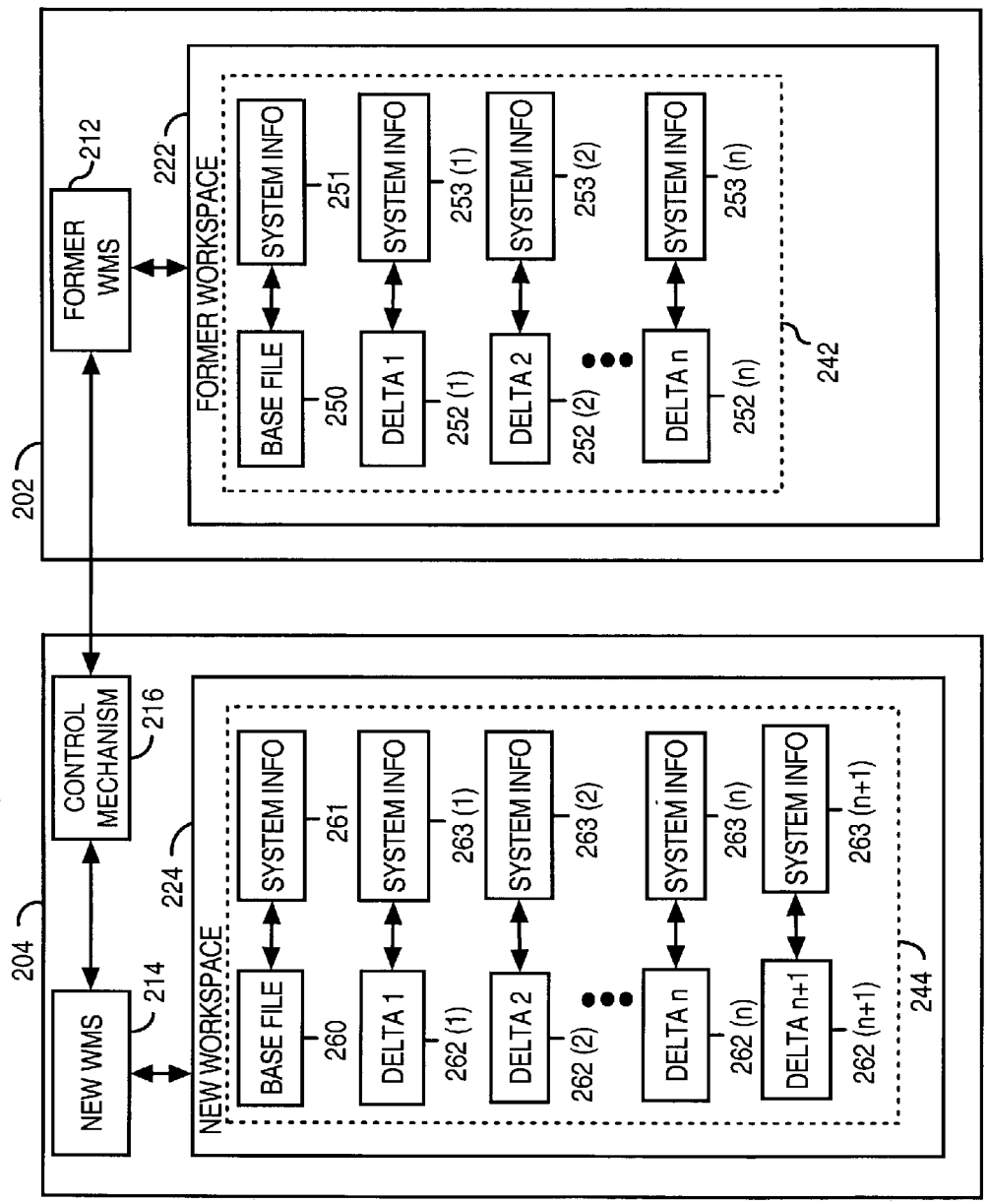
FIG. 2 is a block diagram of an overall system in which one embodiment of the present invention may be implemented.

With the above background information in mind, one possible embodiment of the present invention will now be described. With reference to FIG. 2, there is shown a block diagram of a system in which one embodiment of the present invention may be implemented, the system comprising a first computer system 202 and a second computer system 204. The first computer system 202 comprises a former workspace 222 managed by a former WMS 212, and the second computer system 204 comprises a new workspace 224 managed by a new WMS 214. The former workspace 222 comprises the one or more file sequences 242 that are to be migrated. The new workspace 224 represents the workspace to which the file sequences 242 are to be migrated. For the sake of simplicity, only one file sequence 242 is shown in former workspace 222. It should be noted, though, that for purposes of the present invention, any number of file sequences 242 may be stored in former workspace 222, and may be migrated from former workspace 222 to new workspace 224. In the following discussion, it will be assumed that former WMS 212 and new WMS 214 are different workspace management systems. Thus, new WMS 214 cannot comprehend or interpret the deltas 252 in the file sequence 242 of the former workspace 222, and former WMS 212 cannot comprehend or interpret the deltas 262 in the new file sequence 244 of the new workspace 224.

To coordinate and manage the migration of file sequences 242 from former workspace 222 to new workspace 224, there is provided a control mechanism 216. In one embodiment, control mechanism 216 migrates the file sequences 242 from one workspace to another not by performing a format conversion on the file sequences 242, but rather by invoking and exploiting the functionality provided by the former and new WMS's 212, 214. This will be elaborated upon in a later section. In FIG. 2, control mechanism 216 is shown as residing on a different computer system than the former WMS 212. That being the case, to invoke the functionality of the former WMS 212, control mechanism 216 utilizes a remote invocation mechanism. For purposes of the present invention, control mechanism 216 may use any desired remote invocation mechanism (e.g. CORBA, RMI, UNIX scripting language, etc.) to invoke the functionality of the former WMS 212.

For the sake of illustration, FIG. 2 shows the former WMS 212 and the new WMS 214 as residing on different computer systems. While this is one possible embodiment, it should be noted that, if so desired, all of the various components of FIG. 2 may reside on the same computer system. Also, FIG. 2 shows control mechanism 216 residing on the same computer system 204 as the new WMS 214. This is not required. If so desired, control mechanism 216 may reside on computer system 202 instead, or may reside on a completely separate computer system (not shown). These and other implementations are within the scope of the present invention.

Representative Operation

With reference to FIG. 2 and the flow diagram of FIG. 3, which shows the operational flow for the control mechanism 216 in accordance with one embodiment of the present invention, the process of migrating file sequences 242 from the former workspace 222 to the new workspace 224 will now be described.

Figure 3:
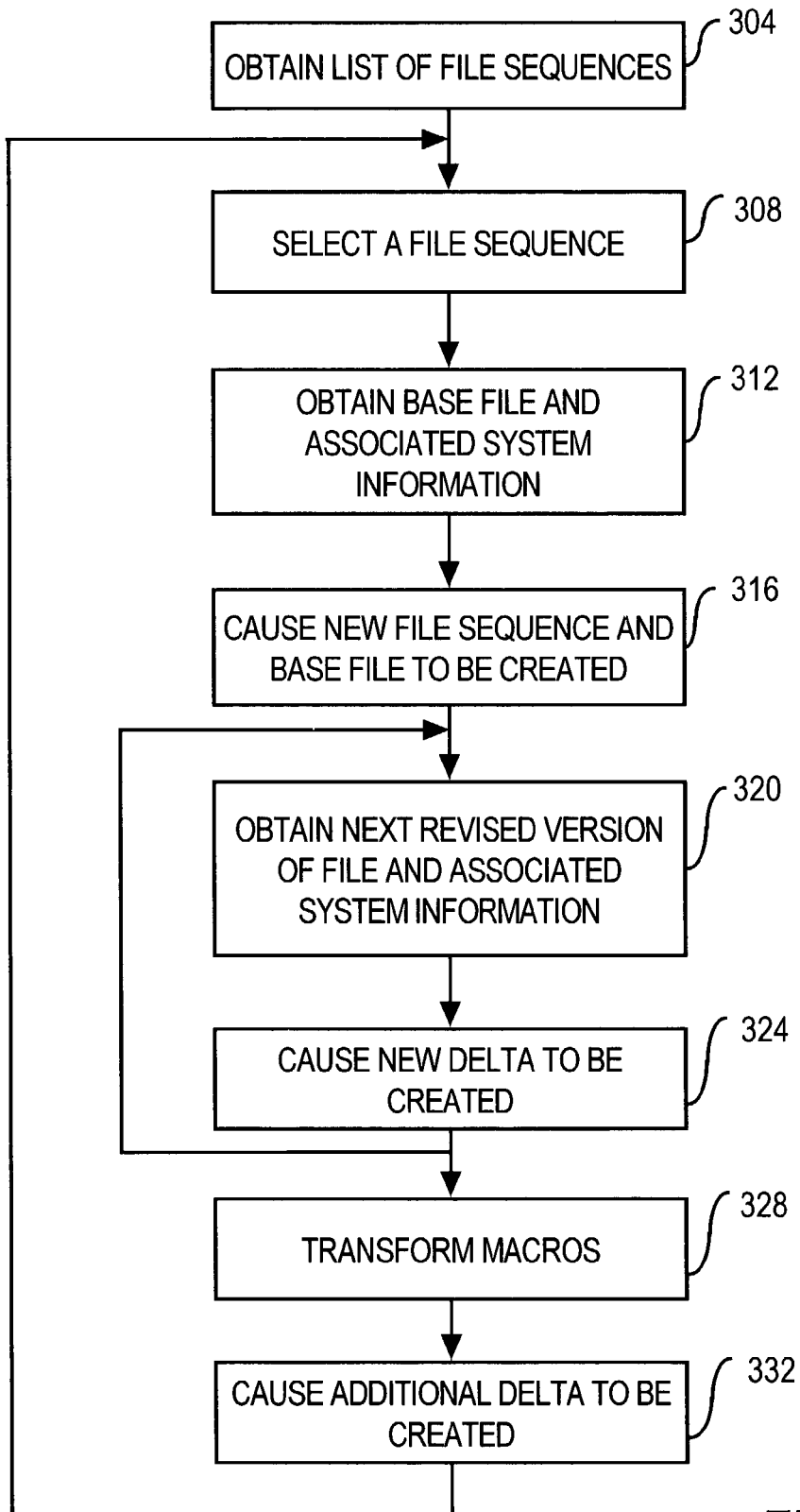
FIG. 3 is a flow diagram illustrating the operation of the control mechanism of FIG. 2 in accordance with one embodiment of the present invention.

As shown in FIG. 3, the control mechanism 216 begins operation by obtaining (304) from the former WMS 212 a list of all of the file sequences 242 in the former workspace 222. To do so, the control mechanism 216 invokes an inventory functionality of the former WMS 212, which causes the former WMS 212 to return a list of all of the file sequences 242 in the former workspace 222, including those file sequences that have been marked for deletion. In one embodiment, this list comprises an identifier (e.g. a file name) for each file sequence 242, and an indication of how many deltas are in each file sequence. After the control mechanism 216 has the list of file sequences, it selects (308) one of the file sequences (i.e. it selects one of the identifiers). For the sake of example, it will be assumed that control mechanism 216 selects file sequence 242.

After a file sequence is selected, the control mechanism 216 proceeds to obtain (312) from the former WMS 212 the base file 250 and associated system information 251 for the selected file sequence 242. In one embodiment, the control mechanism 216 does so by invoking a version generation functionality of the former WMS 212, and asking for just the base file 250 of the selected file sequence 242. In response, the former WMS 212 retrieves the base file 250 and its associated system information 251, and provides it to the control mechanism 216.

Upon receiving this information, the control mechanism 216 proceeds to cause (316) the new WMS 214 to create a new file sequence 244 in the new workspace 224, and to create a new base file 260 in the new file sequence 244. More specifically, the control mechanism 216 invokes a create new file sequence functionality of the new WMS 214, and passes to it the identifier of the selected file sequence 242, the base file 250 received from the former WMS 212, and the associated system information 251. In response, the new WMS 214 creates a new file sequence 244 in the new workspace 224. In one embodiment, the new WMS 214 assigns the new file sequence 244 the same identifier as that used by the former WMS 212. In addition, the new WMS 214 creates a new base file 260 in the new file sequence 224, and stores within it the content of the base file 250 received from the former WMS 212. Furthermore, the new WMS 214 creates a new system information data structure 261, stores within it the system information 251 received from the former WMS 212, and associates the new data structure 261 with the new base file 260. The new file sequence 224 and new base file 260 are thus created. In this manner, the base file 250 and associated system information 251 are migrated from the former workspace 222 to the new workspace 224.

Thereafter, the control mechanism 216 proceeds to migrate the deltas 252 from the file sequence 242 in the former workspace 222 to the new file sequence 244 in the new workspace 224. To do so, the control mechanism 216 enters into a loop. Initially, the control mechanism 216 obtains (320) from the former WMS 212 a next revised version of the base file 250. To do so, the control mechanism 216 invokes the version generation functionality of the former WMS 212, and passes to it the identifier of the selected file sequence 242, and an indication of which delta 252 to apply. In the current example, the next delta to apply is the first delta 252(1). In response to this invocation, the former WMS 212 accesses the base file 250, and applies the first delta 252(1) to it to derive a complete view of the file with the changes in the first delta 252(1) having been made. This view may be thought of as a first revised version of the base file 250. After generating the view, the former WMS 212 provides the view, along with the system information 253(1) associated with the first delta 252(1), to the control mechanism 216. Notice that it is the complete view of the revised base file, and not the delta 252(1), that is provided to the control mechanism.

Upon receiving this information from the former WMS 212, the control mechanism 216 proceeds to cause (324) the new WMS 214 to create a new delta 262 in the new file sequence 244. To do so, the control mechanism 216 invokes a delta creation functionality of the new WMS 214, and passes to it the identifier of the new file sequence 244, the view received from the former WMS 212, and the system information 253(1) received from the former WMS 212. In response to this invocation, the new WMS 214 accesses the new file sequence 244, and compares the view received from the former WMS 212 with the latest version of the base file 260 (in the current example, the latest version of the base file 260 is the base file 260) to determine what change or changes need to be made to the latest version of the base file 260 to derive the view received from the former WMS 212 (this is similar to checking the view into the new workplace). Thereafter, the new WMS 212 creates a new delta 262(1) in the new file sequence 244, and stores within it the change or changes that need to be made to the latest version of the base file 260 to derive the view received from the former WMS 212. Because it is the new WMS 214 that creates the new first delta 262(1), the new first delta 262(1) will be in a format that the new WMS 214 can comprehend and interpret. In addition, the new WMS 214 creates a new system information data structure 263(1), stores within it the system information 253(1) received from the former WMS 212, and associates the new data structure 263(1) with the new first delta 262(1). In this manner, the first delta 252(1) and associated system information 253(1) are effectively migrated from the former workspace 222 to the new workspace 224.

Thereafter, the control mechanism 216 loops back to (320) to migrate the next delta 252(2). Specifically, the control mechanism 216 obtains (320) from the former WMS 212 a next revised version of the base file 250. To do so, the control mechanism 216 invokes the version generation functionality of the former WMS 212, and passes to it the identifier of the selected file sequence 242, and an indication of which delta 252 to apply. This time, the delta to apply is the second delta 252(2). In response to this invocation, the former WMS 212 accesses the base file 250, and applies the first delta 252(1) and the second delta 252(2), in that order, to the base file 250 to derive a complete view of the file with the changes in the first two deltas 252(1), 252(2) having been made. This view may be thought of as a second revised version of the base file 250. After generating the view, the former WMS 212 provides the view, along with the system information 253(2) associated with the second delta 252(2), to the control mechanism 216.

Upon receiving the information from the former WMS 212, the control mechanism 216 proceeds to cause (324) the new WMS 214 to create a new delta 262 in the new file sequence 244. To do so, the control mechanism 216 invokes the delta creation functionality of the new WMS 214, and passes to it the identifier of the new file sequence 244, the view received from the former WMS 212, and the system information 253(2) received from the former WMS 212. In response to this invocation, the new WMS 214 accesses the new file sequence 244, and compares the view received from the former WMS 212 with the latest version of the base file 260 (this time, the latest version of the base file 260 is derived by applying the new first delta 262(1) to the base file 260) to determine what change or changes need to be made to the latest version of the base file 260 to derive the view received from the former WMS 212. Thereafter, the new WMS 212 creates a new delta 262(2) in the new file sequence 244, and stores within it the change or changes that need to be made to the latest version of the base file 260 to derive the view received from the former WMS 212. In addition, the new WMS 214 creates a new system information data structure 263(2), stores within it the system information 253(2) received from the former WMS 212, and associates the new data structure 263(2) with the new delta 262(2). In this manner, the second delta 252(2) and associated system information 253(2) are effectively migrated from the former workspace 222 to the new workspace 224.

Thereafter, the control mechanism 216 loops back to (320) to migrate another delta. This loop continues until all of the deltas 252 in the file sequence 242 in the former workspace 222 have been migrated to the new file sequence 244 in the new workspace 224. Put another way, the loop continues until all of the deltas 252 in the file sequence 242 have a corresponding new delta 262 in the new file sequence 244. At that point, the file sequence 242 will have been effectively migrated to the new workspace 224.

A point to note at this juncture is that in carrying out the migration, the control mechanism 216 has not had to perform any format conversion on the deltas. In fact, the control mechanism 216 need not even know what the formats of the deltas are. Instead, the control mechanism 216 exploits the version generation functionality provided by the former WMS 212 and the delta creation functionality of the new WMS 214 to implement the migration. By avoiding a format conversion process, this embodiment of the present invention makes it possible to migrate file sequences more easily and cost effectively.

After file sequence 242 is migrated into the new workspace 224, some additional processing may be performed on the new file sequence 244 to further refine the file sequence. This additional processing may include a macro transformation operation (328). To elaborate, the latest version of the base file may contain one or more macros that were recognized in the former system 202 but are not recognized in the new system 204. For such obsolete macros, there may be equivalent macros that are recognized in the new system 204. In such cases, the control mechanism 216 transforms (328) the obsolete macros into their equivalent macros. Of course, this will result in a new version of the base file. Hence, the control mechanism 216 causes (332) the new WMS 214 to create an additional delta 262(n+1). This additional delta 262(n+1) will include the changes made by the macro transformations. To cause the additional delta 262(n+1) to be created, the control mechanism 216 invokes the delta creation functionality of the new WMS 214 once again, and passes to it the identifier of the new file sequence 244, the new version of the base file (including the macro transformations), and a set of system information (this time, the system information is generated by the control mechanism 216). In response, the new WMS 214 creates the additional delta 262(n+1) (in the same manner as that described above). In addition, the new WMS 214 creates a new system information data structure 263(n+1), stores within it the system information received from the control mechanism 216, and associates the new data structure 263(n+1) with the additional delta 262(n+1). The macro transformations are thus reflected in the new file sequence 244.

Thereafter, the control mechanism 216 loops back to (308) to select and migrate another file sequence from the former workspace 222 into the new workspace 224. This loop continues until all of the file sequences in the former workspace 222 (including those that have been worked for deletion) have been migrated into the new workspace 224.

Hardware Overview

Figure 4:
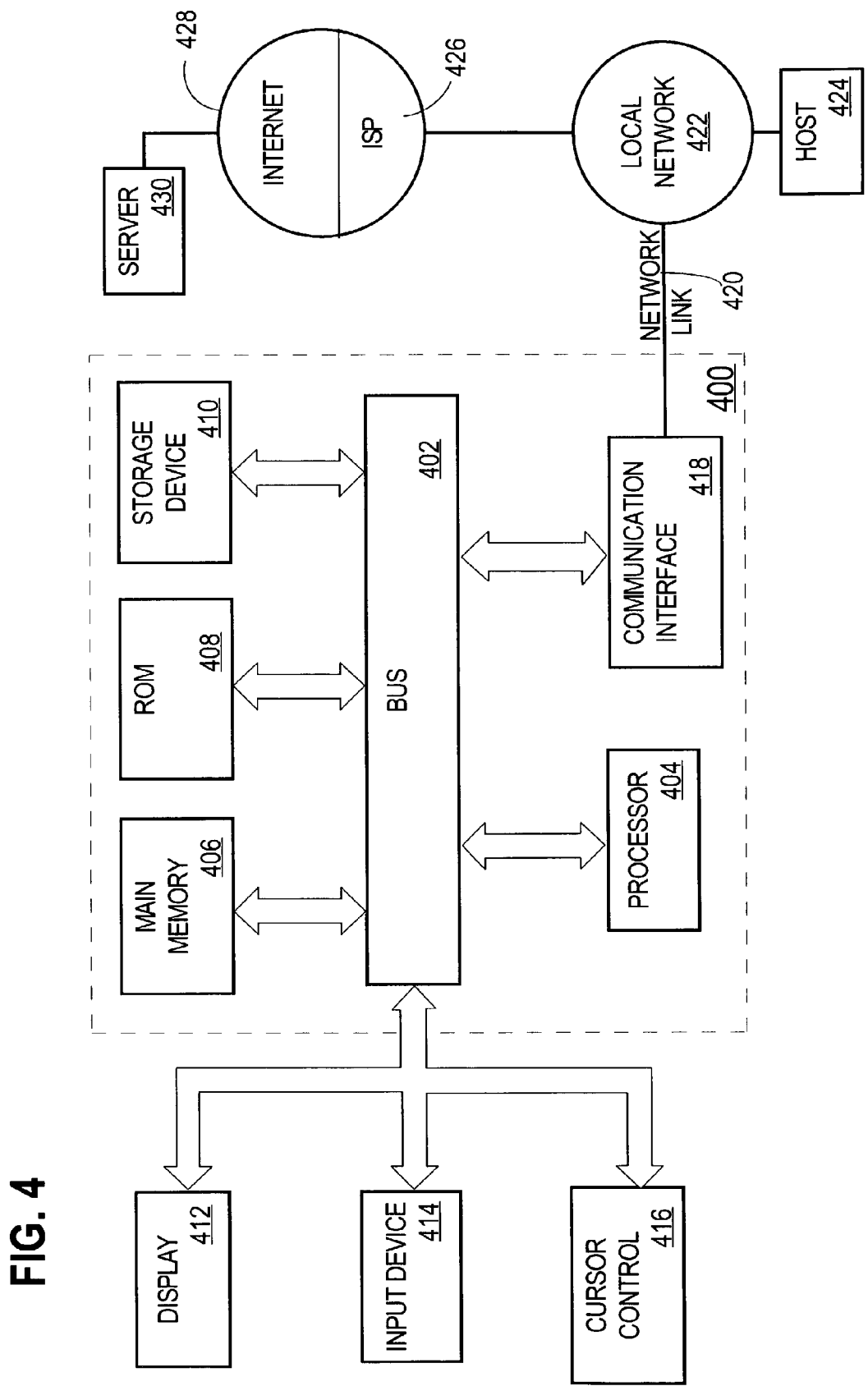
FIG. 4 is a hardware block diagram of a computer system in which one embodiment of the present invention may be implemented.

In one embodiment, the various components shown in FIG. 2 (e.g. control mechanism 216, former WMS 212, and new WMS 214) are implemented as sets of instructions executable by one or more processors. The components may be implemented as part of an object oriented programming system, including but not limited to the JAVA™ programming system manufactured by Sun Microsystems, Inc. of Palo Alto, Calif. FIG. 4 shows a hardware block diagram of a computer system 400 in which one embodiment of the present invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 may also be further used to store temporary variables or other intermediate information during execution of instructions by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

According to one embodiment, the functionality of the present invention is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for migrating a file sequence from one workspace to another, comprising:

selecting a file sequence from a first workspace managed by a first workspace management system (WMS), said file sequence comprising an existing base file and a first delta, wherein said first delta comprises one or more changes to be applied to said existing base file;

obtaining, from the first WMS, said existing base file;

causing a second WMS to create a new file sequence in a second workspace, and to create a new base file in said new file sequence based upon said existing base file;

obtaining, from the first WMS, a first revised version of said existing base file, wherein said first revised version is derived by the first WMS by applying said first delta to said existing base file; and causing the second WMS to create a new first delta in said new file sequence, said new first delta comprising one or more changes to be applied by the second WMS to said new base file to transform said new base file into said first revised version of said existing base file, wherein said first delta has a first format, wherein said new first delta has a second format, and wherein said first and second formats are different.

2. The method of claim 1, wherein causing the second WMS to create a new first delta comprises:

invoking a delta creation functionality of the second WMS to cause the second WMS to compare said first revised version of said existing base file with said new base file, and to determine what change or changes need to be made to said new base file to transform said new base file into said first revised version of said existing base file.

3. The method of claim 1, wherein obtaining a first revised version of said existing base file comprises:

invoking a version generation functionality of the first WMS to cause the first WMS to apply said first delta to said existing base file to derive said first revised version of said existing base file; and receiving said first revised version of said existing base file.

4. The method of claim 1, wherein the first WMS cannot comprehend said second format, and wherein the second WMS cannot comprehend said first format.

5. The method of claim 1, wherein said existing base file has a set of system information associated therewith, and wherein obtaining said existing base file further comprises:

obtaining said set of system information.

6. The method of claim 5, wherein causing a second WMS to create a new base file in said new file sequence comprises:

causing the second WMS to store said set of system information; and causing the second WMS to associate said set of system information with said new base file.

7. The method of claim 1, wherein said first delta has a set of system information associated therewith, and wherein obtaining a first revised version of said existing base file further comprises:

obtaining said set of system information.

8. The method of claim 7, wherein causing the second WMS to create a new first delta comprises:

causing the second WMS to store said set of system information; and causing the second WMS to associate said set of system information with said new first delta.

9. The method of claim 1, wherein said file sequence comprises a file sequence that has been marked for deletion from said first workspace.

10. The method of claim 1, wherein said file sequence comprises a plurality of additional deltas, and where said method further comprises:

obtaining, from the first WMS, a next revised version of said existing base file, wherein said next revised version is derived by the first WMS by applying a next delta;

causing the second WMS to create a new next delta in said new file sequence, said new next delta comprising one or more changes to be applied by the second WMS to derive said next revised version of said existing base file; and repeating the operations of obtaining a next revised version of said existing base file and causing the second WMS to create a new next delta until all deltas in said file sequence has a corresponding new delta in said new file sequence.

11. The method of claim 10, further comprising:

processing a latest revised version of said existing base file to transform one or more macros in said latest revised version of said existing base file from a first form that the first WMS can comprehend to a second form that the second WMS can comprehend; and causing the second WMS to create an additional delta in said new file sequence, said additional delta indicating one or more changes to be applied to implement the transformation of said one or more macros.

12. A computer readable storage medium, comprising:

instructions for causing one or more processors to select a file sequence from a first workspace managed by a first workspace management system (WMS), said file sequence comprising an existing base file and a first delta, wherein said first delta comprises one or more changes to be applied to said existing base file;

instructions for causing one or more processors to obtain, from the first XVMS, said existing base file;

instructions for causing one or more processors to cause a second WMS to create a new file sequence in a second workspace, and to create a new base file in said new file sequence based upon said existing base file;

instructions for causing one or more processors to obtain, from the first WMS, a first revised version of said existing base file, wherein said first revised version is derived by the first WMS by applying said first delta to said existing base file; and instructions for causing one or more processors to cause the second WMS to create a new first delta in said new file sequence, said new first delta comprising one or more changes to be applied by the second WMS to said new base file to transform said new base file into said first revised version of said existing base file, wherein said first delta has a first format, wherein said new first delta has a second format, and wherein said first and second formats are different.

13. The computer readable storage medium of claim 12, wherein the instructions for causing one or more processors to cause the second WMS to create a new first delta comprises:

instructions for causing one or more processors to invoke a delta creation functionality of the second WMS to cause the second WMS to compare said first revised version of said existing base file with said new base file, and to determine what change or changes need to be made to said new base file to transform said new base file into said first revised version of said existing base file.

14. The computer readable storage medium of claim 12, wherein the instructions for causing one or more processors to obtain a first revised version of said existing base file comprises:

instructions for causing one or more processors to invoke a version generation functionality of the first WMS to cause the first WMS to apply said first delta to said existing base file to derive said first revised version of said existing base file; and instructions for causing one or more processors to receive said first revised version of said existing base file.

15. The computer readable storage medium of claim 12, wherein the first WMS cannot comprehend said second format, and wherein the second WMS cannot comprehend said first format.

16. The computer readable storage medium of claim 12, wherein said existing base file has a set of system information associated therewith, and wherein the instructions for causing one or more processors to obtain said existing base file further comprises:
　instructions for causing one or more processors to obtain said set of system information.

17. The computer readable storage medium of claim 16, wherein the instructions for causing one or more processors to cause a second WMS to create a new base file in said new file sequence comprises:
　instructions for causing one or more processors to cause the second WMS to store said set of system information; and
　instructions for causing one or more processors to cause the second WMS to associate said set of system information with said new base file.

18. The computer readable storage medium of claim 12, wherein said first delta has a set of system information associated therewith, and wherein the instructions for causing one or more processors to obtain a first revised version of said existing base file further comprises:
　instructions for causing one or more processors to obtain said set of system information.

19. The computer readable storage medium of claim 18, wherein the instructions for causing one or more processors to cause the second WMS to create a new first delta comprises:
　instructions for causing one or more processors to cause the second WMS to store said set of system information; and
　instructions for causing one or more processors to cause the second WMS to associate said set of system information with said new first delta.

20. The computer readable storage medium of claim 12, wherein said file sequence comprises a file sequence that has been marked for deletion from said first workspace.

21. The computer readable storage medium of claim 12, wherein said file sequence comprises a plurality of additional deltas, and where said computer readable medium further comprises:
　instructions for causing one or more processors to obtain, from the first WMS, a next revised version of said existing base file, wherein said next revised version is derived by the first WMS by applying a next delta;
　instructions for causing one or more processors to cause the second WMS to create a new next delta in said new file sequence, said new next delta comprising one or more changes to be applied by the second WMS to derive said next revised version of said existing base file; and
　instructions for causing one or more processors to repeat the operations of obtaining a next revised version of said existing base file and causing the second WMS to create a new next delta until all deltas in said file sequence has a corresponding new delta in said new file sequence.

22. The computer readable storage medium of claim 21, further comprising:
　instructions for causing one or more processors to process a latest revised version of said existing base file to transform one or more macros in said latest revised version of said existing base file from a first form that the first WMS can comprehend to a second form that the second WMS can comprehend; and
　instructions for causing one or more processors to cause the second WMS to create an additional delta in said new file sequence, said additional delta indicating one or more changes to be applied to implement the transformation of said one or more macros.

* * * * *

UNITED STATES PATENT AND TRADEMARK OFFICE
CERTIFICATE OF CORRECTION

PATENT NO. : 6,973,465 B2
DATED : December 6, 2005
INVENTOR(S) : Aleksandr M. Kuzmin It is certified that error appears in the above-identified patent and that said Letters Patent is hereby corrected as shown below:

<u>Column 12,</u>
Line 27, delete "XVMS," and insert -- WMS, --.

Signed and Sealed this

Ninth Day of May, 2006

JON W. DUDAS
*Director of the United States Patent and Trademark Office*